Feb. 13, 1973 N. H. DESCHAMPS ET AL 3,716,099
MEANS AND METHOD FOR OBTAINING HIGH TEMPERATURE PROCESS
FLUIDS FROM LOW TEMPERATURE ENERGY SOURCES
Filed Nov. 17, 1969 4 Sheets-Sheet 1

INVENTORS
NICHOLAS H. DES CHAMPS
BERNARD STEIN
KENNETH E. MAYO

BY *Richard L. Seligman*
ATTORNEY

Feb. 13, 1973   N. H. DESCHAMPS ET AL   3,716,099
MEANS AND METHOD FOR OBTAINING HIGH TEMPERATURE PROCESS
FLUIDS FROM LOW TEMPERATURE ENERGY SOURCES
Filed Nov. 17, 1969   4 Sheets-Sheet 3

INVENTORS
NICHOLAS H. DES CHAMPS
BERNARD STEIN
KENNETH E. MAYO

BY *Richard H. Seligman*

ATTORNEY

United States Patent Office 3,716,099
Patented Feb. 13, 1973

3,716,099
MEANS AND METHOD FOR OBTAINING HIGH
TEMPERATURE PROCESS FLUIDS FROM LOW
TEMPERATURE ENERGY SOURCES
Nicholas H. Deschamps, Reeds Ferry, N.H., Bernard
Stein, Andover, Mass., and Kenneth E. Mayo, Nashua,
N.H., assignors to Sanders Nuclear Corp., Nashua, N.H.
Filed Nov. 17, 1969, Ser. No. 877,357
Int. Cl. F28f 13/00
U.S. Cl. 165—135                          42 Claims

ABSTRACT OF THE DISCLOSURE

Means and methods are provided for obtaining useful heating of process fluids from a heat energy source which emits penetrating radiation to a surrounding radiation absorber. The absorber has a higher temperature than the source as a result of the penetrating radiation. The fluids are preferably passed over the source and through the absorber to obtained desired controlled heating of the fluids and simultaneous cooling of the source with the heated process fluids being capable of transmitting heat energy in a number of applications. Preferably the heat source is a beta or gamma radioisotope source with surrounding structure to maximize heat transfer to the fluid and minimize return heat flow. The absorber is preferably in a predetermined form to provide a predetermined heat transfer to the fluid under controlled conditions.

BACKGROUND OF THE INVENTION

Radioisotopic heat sources usually include a radioisotope material, acting as a heat source, encapsulation, a radiation shield, thermal insulation, support structure and a heat transfer path or mechanism. The usual means for extracting heat from the radioisotope is to absorb as much of the decay energy as possible within the encapsulated radioisotope heat source which is converted to heat and raises the source temperature. Normally the heat is then conducted by a heat transfer path to a point of use such as a thermoelectric generator, boiler or heat exchanger of some predetermined design. Each of the individual components listed above acts in a particular way for a particular purpose with little coaction in purpose between components used.

In using radioisotopic materials having beta or gamma radiation such as cobalt 60, the decay energy is so penetrating that a substantial quantity of photon or gamma energy escapes the source and is absorbed in the shield. Thus, those skilled in the art have been led to use materials such as cobalt 60 usually for large thermal sources where the self-absorption is high and where there is a relatively small amount of energy that escapes the source and is absorbed in the shield or that escapes altogether. A further problem in designing radioisotopic heat sources is that maximum heat source temperatures must be limited to insure heat source encapsulation integrity for safety reasons.

It is an object of this invention to provide a means and method for obtaining high temperature process fluids with reduced heat source temperatures.

Another object of this invention is to provide a means and method in accordance with the preceding object to enable reduction of source temperature in a source of penetrating radiation.

Still another object of this invention is to provide a means and method in accordance with the preceding objects which insures safety while obtaining increased process fluid temperatures to enable economical use of minimized dimension heat sources having high energy radiation.

It is still another object of the invention to enable the high temperature heating of various process fluids which at their high temperature might have deleterious chemical reactions with fuel encapsulation materials without so endangering the safety of the encapsulation.

It is a feature of this invention that process fluids can be obtained with temperatures far in excess of the heat source temperatures often by many hundreds of degrees. A large mass of the radiation shield acts as a supplemental heat source to heat the process fluid while simultaneously utilizing cold incoming process fluid to cool the energy source of penetrating radiation.

SUMMARY OF THE INVENTION

According to the invention, a means for obtaining a heated process fluid for use as an energy supply means comprises an energy source of penetrating radiation. A radiation absorber is located in an operative position with respect to the energy source and is designed to have a temperature higher than the temperature of the energy source. Means are provided for preventing backflow of heat from the radiation absorber to the energy source and means to define a passageway for the process fluid or a separate cooling fluid to enable it to pass about the energy source. The process fluid then passes through the absorber to obtain a predetermined heat output.

According to the method of this invention, the temperature of a process fluid is raised, to enable it to do useful work, by passing a heat transfer fluid about an energy source of penetrating radiation and then this or another heat transfer fluid is passed through an energy absorber which absorbs the penetrating radiation. Since the absorber is at a higher temperature than the source, the process or heat transfer fluids thus carried are exposed to temperatures higher than those of the heat source. Substantial backflow of heat to the energy source is prevented and a heated fluid output is obtained.

In the preferred embodiment of this invention, the energy source is an isotopic heat energy source of penetrating radiation and the heat transfer fluid cools the source being heated thereby and additionally being heated by passage through a radiation absorber preferably in the form of a packed bed. The use of a packed bed of predetermined size absorber particles, which act as a radiation shield as well as a heat absorber, is important to obtain uniform temperature process fluids of predetermined heat output.

The invention also comprises the use of penetrating energy sources of other than isotopic energy such as light and RF energy producing sources. In such cases, the process fluid acts to cool the source as it does in the case of the isotopic energy source and again enables higher temperatures to be obtained in the fluid than present in the energy source.

In one embodiment of the invention, when isotopic heat energy sources are used, they are preferably encapsulated in elongated thin shapes to aid in structural integrity of the sources increasing safety of the devices of this invention.

It is a feature of this invention that small dimension devices can be obtained which have low source temperature, yet, high process fluid temperatures. The heated process fluids are useful in a variety of applications including undersea mining vehicle power supplies, extremely high temperature gas of controlled composition, long-life heat and power supplies for remote installations, self-powered high temperature process fluid irradiators for food and material processing, hot process fluids for Brayton gas turbines, thermoelectric, thermionic and other heat cycle electric power producing devices, space heating and the like.

BRIEF DESCRIPTION OF THE DRAWINGS

The above and other features, objects and advantages of the invention will be better understood from the following specification when read in conjunction with the accompanying drawings, in which.

DESCRIPTION OF PREFERRED EMBODIMENTS

Figure 1:
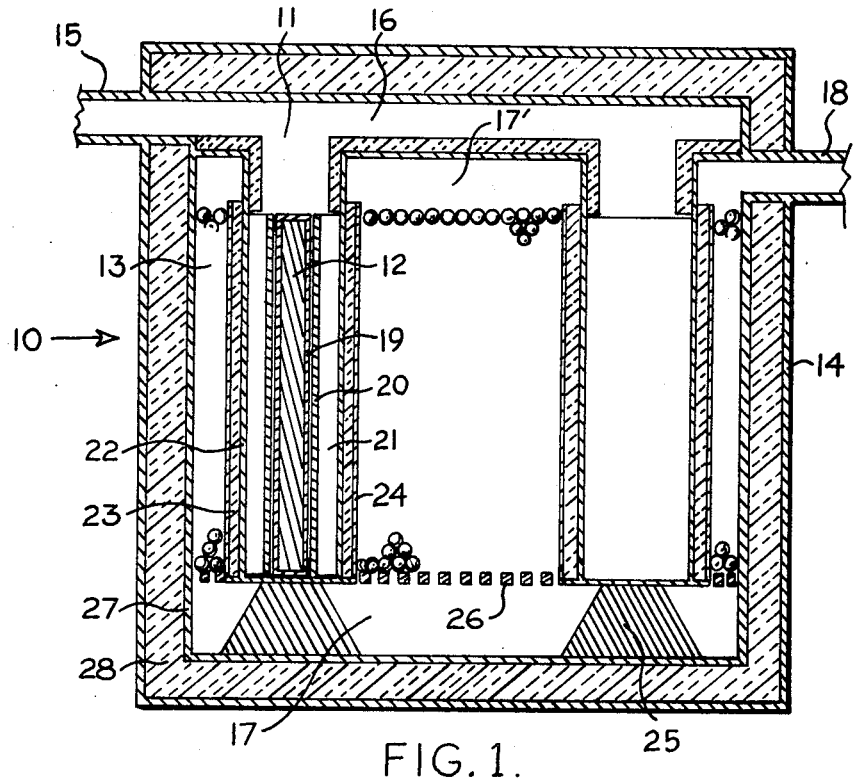
FIG. 1 is a vertical cross sectional view through the center of a preferred embodiment thereof.
Figure 2:
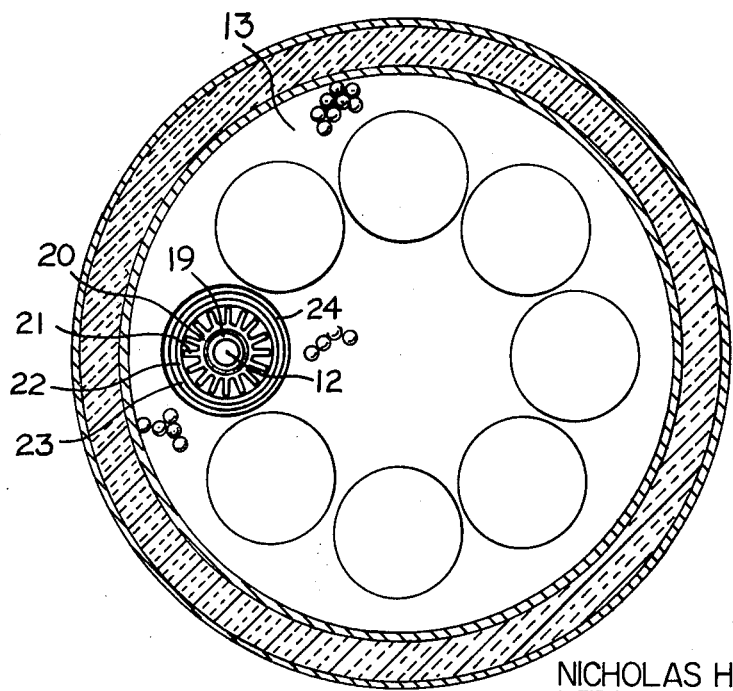
FIG. 2 is a cross sectional view through line 2—2 thereof.

With reference now to the drawings and more particularly FIGS. 1 and 2, a device for obtaining high temperature process fluids is shown generally at 10 and comprises a passageway system denoted generally at 11, a source of penetrating radiation denoted generally at 12, a radiation absorber and shield 13, support structure and an outer casing 14.

In the preferred embodiment, eight radioisotopic heat source units 12 are used located about the geometric center line of the cylindrical outer casing 14.

The heat sources are preferably sources of beta or gamma radiation such as cobalt 60, zirconium-niobium 95, cerium 144, ruthenium 106, cesium 137 and strontium 90. These materials normally absorb low percentages of their own decay energy when configured in relatively slender shapes and are preferred for use. However, alpha emitting radioisotopes which absorb much larger percentages of their own energy because of the relatively short mean free path of alpha particles through virtually any material can also be used. When alpha sources are used, the sources and shield layers are preferably formed in very thin foils and thin passages to reduce self-absorption of radiation and resultant heat buildup in the heat sources. The heat sources 12 are preferably formed in the shape of long cylindrical rods although the shape and dimensions may vary considerably and will be further discussed.

Surrounding the eight heat sources used in the preferred embodiment, is a packed bed of a high density material which has high radiation energy absorption properties. Tungsten is preferred for use and acts both as a radiation shield and absorber whereby it acquires a much higher temperature than the temperature of the heat source in the device 10. Materials such as uranium or high density ceramic materials known in the art as radiation shields can also be used as the absorber surrounding the isotopic heat sources 12. The absorber is preferably in the form of graded spheres of small size although other particle-type forms can be used to control the ratio of free area (space) to solid area and thus to control heating rate. A solid mass with suitable fluid flow holes penetrating the mass can also be used for the packed bed forming the radiation absorber. In some cases, foils, bars or other shapes can be used although small graded spheres are preferred to increase the mixing of the process fluid and thus maintains more uniform fluid temperatures and also to control the absorbed energy as will be described.

The passageway means 11 of the preferred embodiment 10 has a process fluid inlet 15, an upper plenum chamber 16, a lower or intermediate plenum chamber 17, an outlet plenum chamber 17' and a fluid outlet 18. Heat transfer fluid flows in the direction of the arrows shown from inlet 15, to the plenum chamber 16, about the heat sources 12, to plenum chamber 17, through the absorber packed bed 13 to the outlet plenum 17' and out the outlet 18.

Each radioisotope heat source 12 is preferably formed by conventional encapsulation techniques such as welding and/or sealing the radioisotope used preferably in a cylindrical encapsulation 19 of high temperature super alloys as developed by NASA. Each encapsulated heat source is inserted and held in a cylindrical heat transfer sleeve source holder 20 provide with integral fins 21 of high temperature alloy material such as Hastalloy and surrounded by a heat flow passage tube 22 which is in turn surrounded with an insulating layer 23 and a structural support tube 24 to form a heat source module.

The insulating layer 23 preferably prevents convective or conductive thermal energy transfer while permitting radiant energy transfer and may be formed of a material such as evacuated multiple thin layers of high temperature alloy for use with radioisotope gamma emitters or quartz for use with I.R. heat sources. The insulation layer 23 prevents backflow of heat from the absorber 13 and preferably cuts down the return heat transfer by conduction to the heat source by a factor of at least 10%. Thus the insulation layer prevents heat buildup in the absorber 13 from adversely affecting the structural integrity of the heat sources 12. The outside tube 24, which can be of the same materials as layer 23, provides structural integrity to the heat source assembly as shown in FIG. 2. All of the material of the modules are selected for desired thermal conductivity and structural strength at the intended design temperature.

Support structures 25 of radiation shielding material are fixed in position below each of the modules to maintain their position in the casing. Similar support structures (not shown) are located in the plenum chamber at the top of the modules. A perforated circular plate 26 further acts to support the heat source modules as well as the absorber material 13.

In the preferred embodiment, an inner housing 27 forms the bottom of the lower plenum chamber 17. Thermal insulation 28 is positioned between the inner housing 27 and the outer casing 14. Conventional high temperature insulation such as fire brick or Min-K can be used.

In operation of the device shown, cold inlet process fluid enters through inlet 15. The fluid used is preferably an inert heat transfer fluid such as argon but can be other gases or liquids including air, helium, water, sodium, potassium, mercury, Dowtherm, Freon and the like, since the selection of materials of construction and coatings in non-moving parts which have low structural stress as in this system shown allows a great lattitude for selection based on chemical compatibility at the desired temperatures. For instance, ceramic materials are very resistant to oxidizing atmospheres and refractory metals to reducing atmospheres. Either can be used for the construction of the shown equipment. The cool fluid passes to the inlet plenum 16 where it is directed through passageways 22 between the fins 21 and surrounding the immediate vicinity of the radioisotope heat source material whereupon it cools the heat sources 12 and passes to the intermediate plenum 17 and then upwardly through the absorber 13 to the plenum 17' and out of outlet 18 at a high temperature suitable for use as a working fluid.

The ratio of shield absorbed energy of the packed bed 13 to heat source absorbed energy of the heat source 12 is controlled by the geometry of the absorber 13 and the heat sources. Small slender sources surrounded by the absorber 13 have little internal absorption in each source while large bulky sources or close packed sources have much more energy converted to heat within each source and thus relatively less absorbed in the absorber 13. A heat source system can be designed according to the invention with slender sources, small fluid passageways of tube 22 and with a large portion such as 60% to 90% of the decay energy of the radioisotope absorbed in the absorber 13 formed by the packed bed. Thus, cool, high velocity process fluid passing the radioisotope sources substantially cools the sources and carries away with it thermal energy. The fluid then passes slowly through the large mass of the packed bed 13 acquiring a higher temperature before leaving the outlet 18 thus providing a hot process fluid. The temperature of the process fluid can be predetermined by selection of the dimensions, heat sources, fluid flow rate and materials used. Preferably the ratio of outlet temperature of the process fluid to heat source temperature is greater than 1.10 to 1. The devices can be operated at varying temperatures including temperatures at least as high as 3000° K.

All beta and gamma emitting radioisotopes have the characteristic of decay energy being absorbed partially in their own mass as a function of source geometry and source mass. It is for this reason that a "point source" dose-rate calculation is conservative and must be modified to consider source size and mass to arrive at an accurate prediction of the energy escaping an unshielded source. Thus, analysis is made of the decay energy or decay particle energy, that is the mean free path of these particles in various materials and the "half value" or "tenth value" thickness of various materials for these particles to properly design a heat source in accordance with this invention. Typical values for known beta and gamma emitting radioisotopes are known to those skilled in the art as listed in the following table:

| Radioisotope | Symbol | Absorber half value thickness, centimeters | | |
|---|---|---|---|---|
| | | Iron | Lead | Uranium |
| Cobalt 60 | Co60 | 2.0 | 1.0 | 0.6 |
| Zirconium-niobium 95 | (Zr-Nb)95 | 1.4 | 0.6 | 0.3 |
| Cerium 144 | Ce144 | 2.2 | 1.5 | 0.8 |
| Ruthenium 106 | Ru106 | 2.0 | 1.5 | 0.8 |
| Cesium 137 | Cs137 | 1.6 | 0.8 | 0.6 |
| Strontium 90 | Sr90 | 1.8 | 1.1 | 0.6 |

From the above table it can be seen that if the thickness of the heat source is twice the half value thickness value then approximately half the decay energy will be absorbed within the source assuming that the radioactive atoms are equally distributed through the source or that they all originate at the center of the source. To achieve greater than 50% heat energy absorption in the shield formed by the packed bed 13, a source assembly can be made which is equivalent to less than two half value thicknesses. The design calculations to achieve this are well-known in the art of nuclear shielding. Thus, a shield design surrounding such a source which permits the escape of less than 1% of the source energy, captures over half of the source energy and converts that energy to heat.

Figure 3:
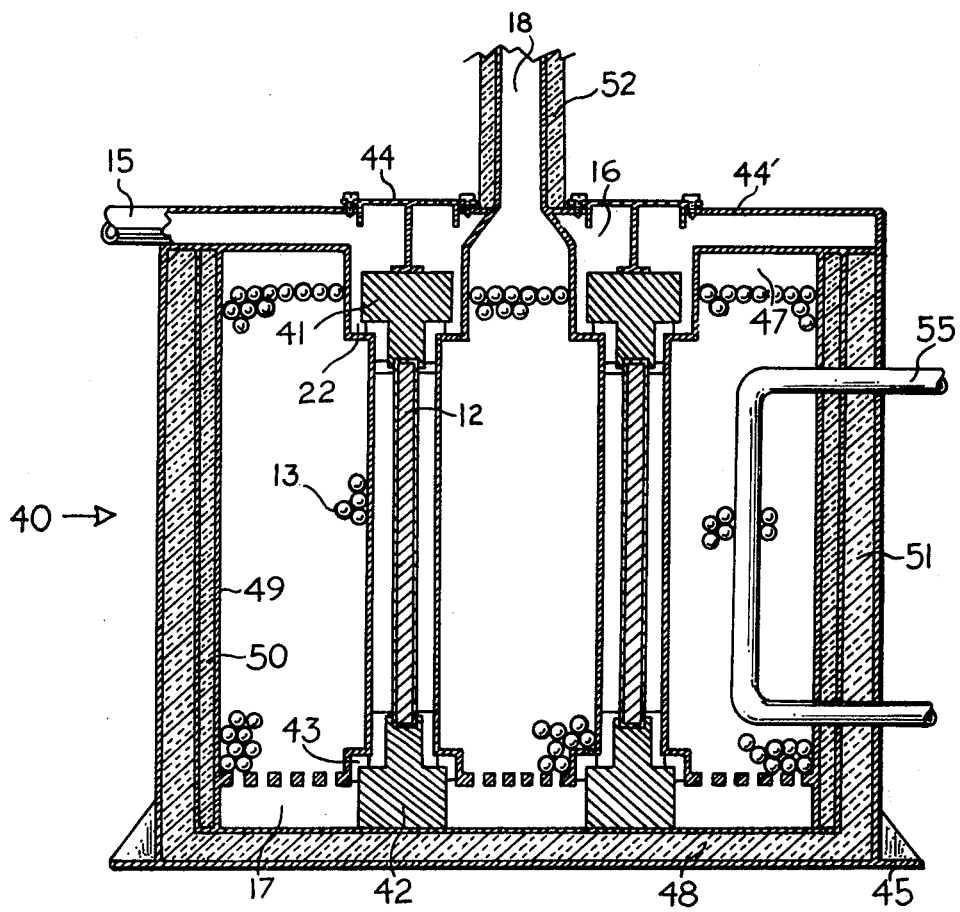
FIG. 3 is a cross sectional view through the center of an alternate embodiment thereof.

FIG. 3 is a cross section through a cylindrical device 40 of this invention generally similar to device 10 where identical parts are designated by identical numerals. In the device 40, the heat sources 12 are contained within the module structures described with reference to FIG. 1 with the entire unit being generally symmetrical about a vertical center line. Source end shields and supports 41 and 42 are located and held in place by radial fins 43 to permit fluid passage. End shield plug 41 with heat source 12 and its assembly can be removed as a unit for replacement through a loading port 44 in the shape of a circular cover attached to the outer casing 44 above each heat source 12. A holding shoe 45 having a ring-shape is provided on the outer casing to enable clamping of the device in place.

Since the coolest heat transfer fluid enters at inlet 15 and passes through plenum 16 thence warming in passageways 22 to the intermediate temperature in plenum 17 and finally heating in the packed bed 13 to the highest temperature in an upper plenum 47, only moderate thermal insulation is required between the plenum 16 and the plenum 47. Heat lost at this interface is not wasted, but represents a source of temperature loss to exit fluid and temperature increase to fluid cooling the radioisotopic sources. The plenum 47 is interconnected with the outlet 18 which in this case extends along the axis of the device.

The bottom of the device 40, which carries the greatest structural load, in associated with the intermediate fluid temperature, that is, heat in the fluid has been picked up from the heat source but not from the packed bed 13. The bottom of the device must be well insulated against heat loss by conduction if high thermal performance is required of the system. Thus, the lower part of the device at 48 between the inner shell and outer casing is preferably insulated with structural insulation such as multifoil, Min-K, magnesia or kaolin brick. The side of the cylindrical device 40 requires the most sophisticated insulation since the process fluid reaches its highest temperature as it rises through the packed bed 13 to the plenum 47. The side walls of the embodiment of FIG. 3 include a packed bed containment wall 49 of a metal such as a high grade steel alloy surrounded with super insulation 50 such as multifoil, ceramic material or Min-K. This area can also be constructed as a vacuum chamber or Dewar vessel if desired, to further improve insulation effectiveness. A low temperature, high efficiency insulation such as fiber glass 51 is packed between the shell and the outer protective casing to further improve the insulation of the side wall. The fluid outlet 18 is preferably insulated in the usual fashion with high temperature piping or ducting as shown at 52.

In a specific example of this invention, when cobalt 60 rods ¾ inch in diameter and 15 inches long are used in the embodiment of FIG. 3 having eight radioisotopic heat sources, and using argon as the heat transfer fluid operation can be maintained within a 850° C. heat source surface temperature and 2000° C. outlet gas temperature. The same unit can be operated at 490° C. source surface temperature and 900° C. outlet temperature. Slight modifications of the design consist almost entirely of changing the value of insulation layer 23 and the mass flow rates to vary the source temperatures and outlet temperatures as desired over extremely broad ranges and to obtain exit temperatures as high as the integrity of the selected containment material permits. This embodiment utilizes ⅛ inch diameter tungsten balls surrounding the energy sources and ⅛ inch diameter nickel balls within the circle formed by the energy sources.

Figure 9:
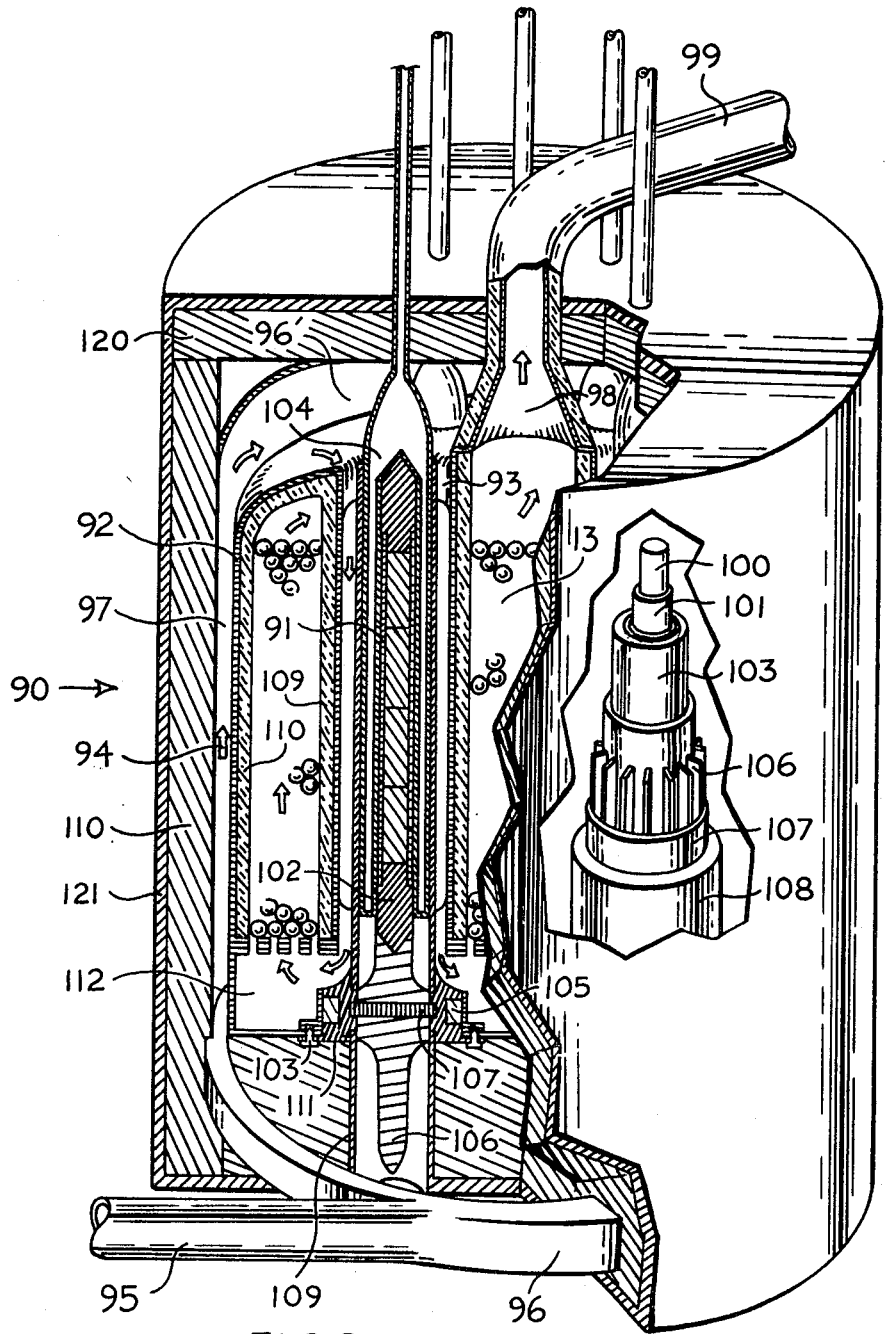
FIG. 9 is a front perspective view with portions cut away of still another alternate embodiment of the invention.

The device of FIG. 9 is illustrated generally at 90 and is basically similar to the devices of FIGS. 1–3 although it employs certain additional features. The device 90 is generally symmetrical about a central vertically extending axis and employs eight preferably identical elongated heat energy sources indicated generally at 91. A packed bed 13 of tunsten balls preferably having uniform diameter surrounds the heat source units and is also positioned centrally thereof to act as a radiation absorber and provided fluid passageways as previously described. The packed bed is contained by a cylindrical structural wall member or casing 92 provided with end to end passageways 93 for mounting of the heat source units.

Flow passageways for a process fluid, the flow pattern of which is indicated by arrows 94, are provided by an inlet 95, annular inlet plenums 96 and 96', side wall passageways 97, outlet plenum 98 and outlet tube 99. This flow pattern conserves heat losses from the system and protects the outer support structure from excessive temperature.

The heat source units 91 as best shown on the right side of FIG. 3 are each made up of conventional radioactive isotopic cobalt 60 fuel capsules 100 packed end to end within a cylindrical assembly sheath 101 fitted with cylindrical tungsten end shield members 102 in a known manner. This assembly diameter is made smaller than the deceleration damper 106 to permit free passage through tubes 109 as will be described. Surrounding the sheath 101 is a potassium reflux overtemperature limiter 103 defining a passageway 104 which is evacuated and interconnected with a passageway of an air cooled reflux radiator 105 having outwardly extending fins. Potassium metal is positioned in the reflux overtemperature limiter and acts to remove heat if the heat sources heat up beyond the desired point. Overtemperature in the heat sources will cause vaporization of the potassium whereupon a gaseous potassium flow is set up leading to the radiators 105 where the gases condense and dissipate heat energy with the condensed liquid potassium flowing back down to again surround the heat sources.

Surrounding the potassium reflux overtemperature limiter is a finned tube 106 which provides passageways for the process fluid to flow about the heat source unit as will be described. An inner insulation sleeve 107 surrounds the finned tube 106 and is in turn surrounded by a layer of super insulation 108. Super insulation is also employed in lining members 109 and 110 to contain heat within the packed bed obtained by penetrating radiation from the heat source. Each of the heat source units 91 are preferably constructed as described above.

Preferably each heat source unit is located in the device by means of a metallic ferrule 111 bolted to the underside of containment wall 92 by screws or bolts 103. The ferrule contains an electrically operated release coil 105 having leads passing to the outside of the device. A deceleration damper 106 supports the lower tungsten end shield and carries a spring loaded fusible emergency release member 107. Under overheat conditions the fusible release 107 melts permitting the heat source to be removed from the device 90 by gravity through an inert gas filled lower tube 109 if desired. Under other emergency conditions, the electrically operated heating coil can be actuated to effect similar removal of the cobalt 60.

The entire device is encased within a biological shield 110 having end caps 120 at the top and bottom. The outer layer or external casing 121 of the device can be a suitable high temperature resistant, metallic mechanically strong shell.

Another refinement of the present invention embodied in the device 90 is the use of a getter material within the wall 92 underlying the packed bed 13. The area of the getter material acts as an intermediate plenum. The getter material 112 can be nickel wool, wetted with sodium potassium (NaK) and acts to remove any unwanted oxygen from the process fluid by reaction of oxygen with the large surface area of the NaK. Other getter materials can be used to remove unwanted or reactive gases. The packed bed 13 is supported above the getter by a perforated plate 26 as previously described.

Turning now to operation of the device 90, an inert gas such as argon or nitrogen which is inert in the system, is passed into the gas inlet 95 and follows the path of the arrows 94 through the annular inlet plenum 96 up through side passageways created by spacers 115 about the top of the unit and down through the finned passageways of each of the heat source units 91. The gas is then passed through the getter material which is preferably in the form of NaK saturated nickel wool or particles to thoroughly cleanse the gas of oxygen which could be harmful in the tungsten packed bed. The so heated process fluid then passes upwardly to an outlet plenum 98. As it passes upwardly, the gas picks up heat from the packed bed as described in connection with the other embodiments of this invention and passes outwardly through the gas outlet 99. The gas or process fluid used acts to cool the heat source units while picking up heat energy in the packed bed. The use of the potassium reflux overtemperature limiter acts as a cooling means only when necessary to prevent the heat source units from reaching damaging temperatures. Otherwise boiling in the refluxers does not occur and vapor transport is not affected.

It is a feature of the embodiment 90 that excessive temperatures in the heat source unit used can be prevented by the radiators 105 which act as heat exchangers. Other heat exchange means can be employed if desired. For example, a cooling fluid flow can be established directly about the heat source units leading to the outside of the device 90.

Still another feature is the use of a getter material in the device prior to exposure of the process fluid to the tungsten thereby eliminating the need to coat the tungsten balls with a protective surface.

The packed bed 13 can be formed as described with regard to the other embodiments of this invention. For example, different materials can be used for the spheres or balls. Thus, tungsten balls can be used in the outer annular section of the bed and nickel balls can be used directly underlying the outlet plenum 98. Suitable super insulation or other heat insulation can be used where desired within the housing 111 to maximize efficiency and prevent heat loss to the outside.

Further it can now be seen that separate cooling systems can be provided for the Co60 heat sources and the packed bed. For example, the inlet process fluid can be admitted to the intermediate plenum 112 and a separate fluid flow loop or the refluxer system can be used to control the heat source 100 temperature. This may be desirable to prevent the possible release of radioisotopic material into the process fluid loop. It may also be desirable in closed loop processes wherein the return fluid temperature or process fluid inlet temperature exceeds the desired heat source temperature.

In a specific example of the device of FIG. 9, the overall dimensions of the unit are 30 inches diameter and 50 inches in height of the casing 121. The unit weighs approximately 11,000 lbs. All structural material is of stainless steel with the exception of structural material interior of the casing which is exposed to high temperature and formed of Inconel 600. The circle formed by the center of the heat sources has a diameter of 16 centimeters with ⅛ inch diameter nickel balls within the circle and ⅛ inch diameter nickel plated, preoxidized tungsten balls surrounding the center as shown with an outside diameter of 40 centimeters. The heat sources are cobalt 60. This design provides 25% of the total energy absorbed in the heat source fuel capsules and 75% of the total energy absorbed in the packed bed. The insulation layer separating each heat source from the packed bed is Fiberfrax 0.18 inch thick. Using a mass flow rate of 0.165 lb. per second of argon the inlet temperature is 95° C., the intermediate plenum temperature at the getter is 400° C. and the exit temperature is 900° C. The biological shielding is depleted uranium 9.2 cm. thick to give a surface dose rate not exceeding 200 mr./hour at the surface.

Figure 5:
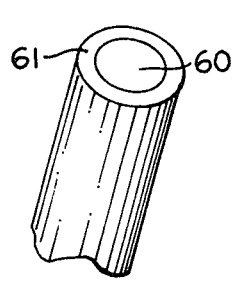
FIGS. 5, 6 and 7 are fragmentary perspective side views illustrating fabrication of a preferred radioisotopic heat source unit for use in this invention.
Figure 6:
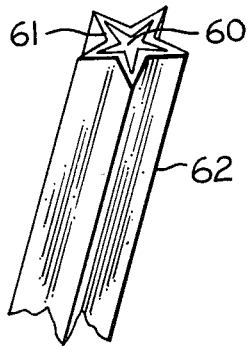
Figure 7:
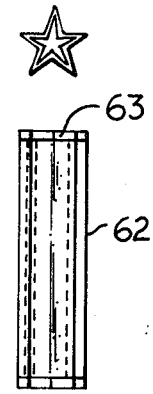

FIGS. 5–7 illustrate an alternate radioisotope heat source encapsulation which can be employed in the devices such as 10 and 40 of the present invention. The heat source 62 is designed to enable cold encapsulation and capture of very high percentages of available decay energy in the packed bed 13. Thus, the heat source is formed directly into a finned unit having longitudinally extending fins by known techniques. Cobalt or other materials such as thulium and thulium oxide in the form of a wire 60 is fabricated by encasement within a tube of zirconium 61. Suitable known cold encapsulating materials such as molybdenum or tantalum can be used in place of zirconium. The assembly shown in FIG. 5 is then swaged, drawn or extruded to yield an extremely slender, finned encapsulated cold radioisotope target 62. The target 62 is cut to length and suitable end caps 63 welded or otherwise sealed to form an encapsulation. The encapsulated cold target is then irradiated for a predetermined time to obtain low cost radioisotopic heat sources which have very low self-absorption characteristics and which can be inserted as a unit into devices such as 10 and 40 of the present invention. Because of the integral finned construction of the encapsulation, in the consideration of accidental rupture of the devices such as 10 and 40 of this invention, the individual heat sources have very low internal heating and thus a much lower likelihood of subsequent rupture and release of radioactive materials.

In some cases, the devices of this invention such as 10 and 40 can be fitted with means for controlling maximum temperature. Thus as best shown in FIG. 3, a high temperature resistant, high heat conductive pipe 55 can be passed into the device 40 and positioned within the packed bed 13. This heat pipe is used to reject unwanted heat in order to control the maximum temperature of the bed 13, to compensate for excess power which may be generated at the beginning of radioisotope life, and thus control the exit temperature of the process fluid to a predetermined constant value over a substantial portion of the useful life of the radioisotope heat sources used. The heat pipes can control heat by standard techniques such as the passage of a cooling heat transfer fluid through selected portions of the absorber 13. The positioning of the pipe, size and dimensions will vary greatly depending upon the type of control necessary in any particular application.

The devices of this invention can be constructed to permit phase change or boiling in the absorber bed so that a liquid process fluid is admitted to the system through the inlet 15 and a gaseous process fluid is extracted through the outlet 18 as for example when required for use in a Rankine cycle. Such a modified device provides quiet boiling and super heating of the vapor as desired to yield a predetermined vapor quality or degree of dryness which can be an important aspect of steam turbine systems. These changes can easily be accomplished since thermal energy can be generated at a desired rate throughout the packed bed 13 as a function of the density of the absorber material used. The use of the packed bed enables variation of density of the packed bed and thus temperature variation as will be described. In addition, by controlling fluid input rate, the liquid level in the packed bed 13 can be controlled at the liquid-vapor interface thus the distance traveled and heating of the vapor can be controlled directly to affect the desired vapor quality by simply controlling the mass flow rate of the process fluid through the devices.

Figure 4:
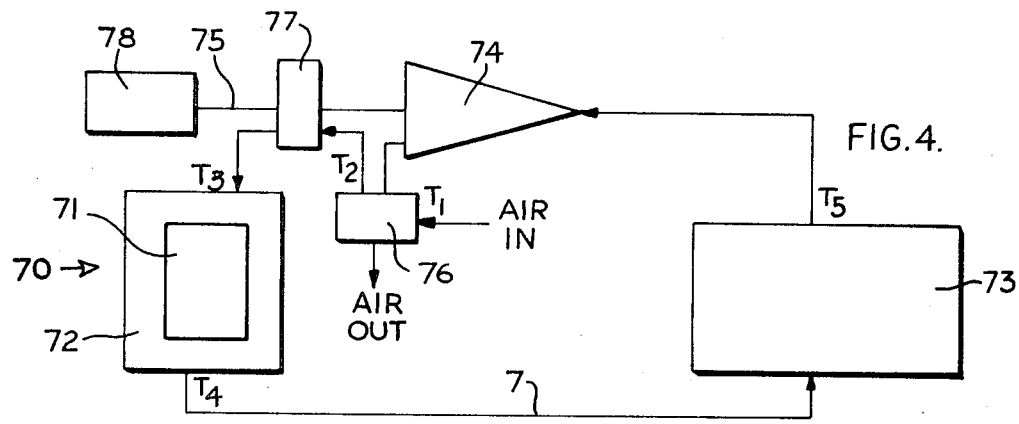
FIG. 4 is a diagrammatic view of an application of the device of FIG. 1.

In an example showing a specific application of the devices of this invention, a power generating system such as a close cycle Brayton gas turbine system 70 is illustrated diagrammatically in FIG. 4.

An encapsulated radioisotope source 71 is provided with a surrounding gas path 72 which permits an argon process fluid to pass by the isotope source and extract heat from it. The argon then passes through a packed bed 73 of radiation absorbing particles which surrounds the encapsulated radioisotope source 71 and gas path 72 but is separated from them in the drawing for clarity. Passing slowly through the packed bed 73, the argon is further heated by the shield absorbed energy and reaches a high temperature where it is admitted to a gas turbine 74. The heated argon is allowed to expand and do work by turning the turbine rotor and shaft 75 and is exited at a predetermined temperature after the expansion. An after cooler 76 allows the argon to be cooled further to still another temperature before it is admitted to a turbine driven shaft compressor 77 thus exiting the compressor at still another temperature whereupon the argon is forced back through the heat source 71. Excess power not used to drive the compressor 77 is available to drive an electric generator such as 78.

The Brayton gas turbine, Rankine liquid-vapor cycle and the Sterling engine are all cycles for thermal power extraction which are well-known and highly developed using various process fluids to which the present invention can be applied.

Figure 8:
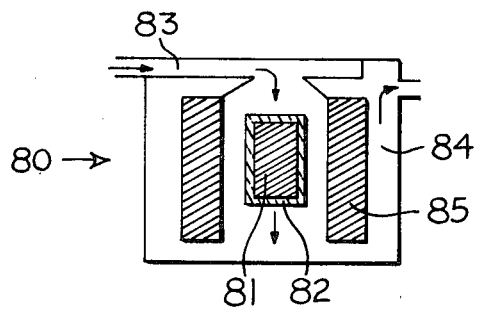
FIG. 8 is a diagrammatic view of an alternate embodiment of the invention.

With reference now to FIG. 8, an alternate embodiment of the invention is shown diagrammatically at 80 and illustrates an application of the present invention to a source of penetrating radiation other than that of radioisotope decay particle energy. For example, the present invention is useful with penetrating radiation energy sources of light energy and radio frequency energy since both light and radio frequency energy can emanate from a source with only partial absorption of radiation in the source and subsequent absorption at relatively controlled rates in a surrounding energy absorber material.

In the device 80, an electrically heated source 81 having a radiation emitter is surrounded with a quartz or fused silica envelope 82 for the purpose of allowing transmission of infrared energy. The source can be a tungsten iodide high intensity incandescent lamp having an emitter or lamps such as xenon or mercury vapor lamps having maximum emission at different wavelengths can be used. The envelope of the source is cooled by an incoming process fluid indicated by arrows 83 which fluid is passed about the lamp within a thermal barrier sleeve 85 which prevents heat transfer by conduction but permits passage of radiation energy. The thermal barrier sleeve is preferably a double wall cylinder sealed at both ends and evacuated to prevent conductive heat transfer but permits radiant heat transfer at the emitter wavelength. The material of the sleeve can be quartz or calcium aluminate or other materials known to be highly conductive to I.R., visible and radio frequency wavelengths.

A packed bed absorber 84 is designed to absorb the radiated energy from the source 81 and heat the heat transfer fluid passing in the path of arrows 83. Glass filter materials which are known in the art can be used to form the packed bed absorber and predictably permit controlled absorption for various wavelengths of energy. The glass filter materials are in the form of beads or spheres and in this example are made of Pyrex for I.R. absorptivity and are arranged as discussed above with relation to the packed bed 13. Thus very high temperature outlet process fluids can be achieved for useful work while holding the energy source envelope to a relatively low temperature well below the temperature of the outlet process fluid.

The packed bed has been described as the preferred form of radiation absorber where the bed is formed by particles which are preferably spheres. The bed is preferably of cylindrical or annular shape with the energy source at or near the center or arranged about the center if more than one source is used. A uniform fluid flow rate across the area of the packed bed and a uniform percentage energy absorption characteristic across the bed yields a high specific energy absorption near the center of the cylinder of the bed and a low specific energy absorption near the outer edge when equal size spheres are used formed of the same material. This in some cases results in a fluid temperature gradient across the bed so that in the high temperature plenum 17', cooler fluid from the outer edge mixes with hotter fluid from the central portion of the annular packed bed. In some cases, mixing of high and low temperature heat transfer fluids results in an undesirable intermediate temperature outlet fluid while the materials used in the devices must still be able to withstand the highest fluid temperature experienced in the system. However, it is possible to obtain uniform process fluid temperatures across the cross section of the bed. If the materials used in the packed bed at the central portion thereof have a lower percentage absorption of source radiation and are graded so that the outer peripheral portion of the packed bed is made of a material of a high percentage absorption, it is possible to effectively flatten the profile of energy absorbed per unit volume of bed across the diameter of the bed. Another means of obtaining uniformly heated outlet fluid is to vary the size of passageways through the packed bed, thus a change in fluid rates can be effected at different portions of the bed which can be combined with increasing absorber density to control uniformity of heating in the heat transfer fluid.

For example, when using visible light or infra-red as the radiated energy from the energy source, the inner region of the bed closest to the high specific radiant energy content of the source is made of a packed bed with high transmittance to the wavelengths involved or of a glass that absorbs only a narrow band of the source emitted wavelengths. Thus if the source emits large amounts of infra-red and smaller amounts of blue light, the inner portion of the bed might be made of glass balls of a uniform size which pass infra-red well but absorb blue and ultraviolet light. The next annular layer might then be made of glass balls of uniform size that pass infra-red but absorb visible red to green light. The next layer can be made of glass spheres of uniform diameter that absorb infra-red and the outer layer is made of a packed bed of the same material but of graded diameter spheres. A bed of spheres of uniform diameter has approximately 72% packing density with 28% free fluid flow space between spheres regardless of the sphere diameter selected. The addition of small spheres at the outer annular layer reduces the remaining 28% free fluid flow space available between the spheres and serves to increase the energy absorber density at the outer annular layer. The outer annular layer as described above thus has a higher specific energy absorption characteristic as well as a reduced heat transfer fluid flow rate. A relatively constant temperature gradient across the packed bed diameter can thus be obtained.

The principles described above can be used to achieve a flat radial temperature profile in a packed bed absorber for beta-gamma energy systems having radioisotope sources or any sources of electromagnetic energy including X-rays. The mass absorption effect is the primary source of thermal energy in connection with devices having electromagnetic energy radioisotope sources. Thus, the packed bed 13 can be formed by using two materials of widely diverse mass absorption cross section and with high temperature capabilities such as magnesium oxide and tungsten. Tungsten has a melting point of 3370° C. and a density of about 19 gm./cc. Magnesium oxide has a melting point of 2800° C. and a density of 3.58 gm./cc. or lower depending upon the structure of its fabrication. By mixing small spheres having diameters in the range of from $\frac{1}{16}$ inch to 1 inch of these materials in various proportions and by using spheres of uniform diameter for each material, the bulk density of the packed bed can be varied from above 3 gm./cc. up to 72% of 19 gm./cc. or 11.8 gm./cc. Packed or sintered compositions of tungsten spheres of graded size can also be used to reduce the fluid flow path and increase the absorber density from near a top limit of the density of soil tungsten 19 gm./cc. down. By calculating the percent of radiated energy incident at any point along the diameter or radius of the absorber packed bed 13 one can determine the amount of absorption at that point and thus obtain uniform heat values at all points along the diameter. This method allows selection of material which will have the desired mass absorption characteristics. Furthermore, the outer edge of packed bed can be maintained at a relatively uniform heat transfer fluid temperature compared to the center of the unit and/or at a temperature point where the heat loss by conduction and thermal radiation from the outer edge of the bed exceeds the heat generation rate. At that point, the design provides an effective thermal barrier to prevent radial heat transfer losses from the devices.

Any of the embodiments of FIGS. 1–3, 8 and 9 can be modified to provide a cooling heat transfer fluid directed about the heat source and then passing out of the device without necessarily passing through the packed bed or the radiation absorber used. When the devices are so modified, a separate process fluid path is set up passing through the packed bed or radiation absorber whereby heat is removed from the absorber and the process fluid heated. Similarly in the embodiment of FIG. 3 utilizing the pipe 55 the heat transfer fluid passed therethrough can be considered a process fluid in that it removes heat from the bed 13.

While specific embodiments of the present invention have been described and illustrated, many variations thereof are possible. For example, specific sizes, temperatures, flow rates and dimensions can vary greatly consistent with particular applications of use. Features of each of the alternate embodiments described can be interchanged. Various known heat exchange means can be used to control unwanted excessive heat generated in the heat sources used.

What is claimed is:

1. A means for obtaining a heated process fluid for use as an energy supply means comprising:
    an energy source of penetrating radiation,
    a radiation absorber located in an operative position with respect to said energy source and designed to have a temperature higher than the temperature of said energy source,
    means for preventing backflow of heat by conduction from said radiation absorber to said energy source,
    and means defining a passageway for said fluid for permitting fluid flow about said energy source and through said absorber to obtain a predetermined heat output in said fluid.

2. A means in accordance with claim 1 wherein said radiation absorber is in the form of a packed bed of particles and is positioned around said energy source.

3. A means in accordance with claim 2 wherein said particles are in the form of spheres.

4. A means in accordance with claim 2 wherein said particles of said packed bed are selected to provide for different amounts of radiation absorption in different portions of said radiation absorber to obtain a uniformly heated process fluid.

5. A means in accordance with claim 4 wherein said radiation absorber has an annular form, an inner portion and an outer portion with the material of said radiation absorber varying in degree of radiation absorption from said inner portion to said outer portion.

6. A means in accordance with the means of claim 3 wherein said spheres are of predetermined varying size to control passage of said heat transfer fluid therethrough.

7. A means in accordance with the means of claim 1 wherein said energy source is a radioisotopic material heat source designed to have a thickness less than two half values of said radioisotopic material whereby less than 50% of the heat generated thereby is absorbed by the source and more than 50% is absorbed by said radiation absorber.

8. A means in accordance with the means of claim 1 wherein said energy source is selected from the electromagnetic energy emitter group consisting of alpha radiation mitters, beta radiation emitters, gamma radiation emitters, X-ray, light wave emitters and radio frequency energy emitters.

9. A means in accordance with the means of claim 7 wherein said radiation absorber is in the form of a packed bed of particles surrounding said heat source,
    an insulation layer separating said radiation absorber and heat source and preventing backflow of heat by conduction but permitting transfer of heating energy from said energy source to said radiation absorber by radiation.

10. A means in accordance with the means of claim 9 wherein said energy source is a thin elongated encapsulated radioisotopic material.

11. A means in accordance with the means of claim 9 wherein said energy source is located substantially centrally within said surrounding radiation absorber.

12. A means in accordance with the means of claim 11 wherein the ratio of outlet temperature of said process fluid to heat source temperature is greater than 1.10 to 1.

13. A means in accordance with the means of claim 12 wherein said energy source is a cold encapsulated radioisotopic material which is later irradiated.

14. A means in accordance with the means of claim 1 wherein said energy source comprises a radioisotopic material having a containment encapsulation and a surrounding flow tube, said flow tube being separated from said radioisotopic material by a plurality of elongated fins to define a portion of said passageway means.

15. A means for obtaining a heated process fluid for use as an energy supply means comprising, a radioisotopic heat source of penetrating radiation, an outer casing surrounding said energy source, an entrance plenum, an intermediate plenum and an outlet means for providing a continuous passageway for flow of a heat transfer fluid about said energy source to said outlet, a radiation absorber positioned between said outer casing and said heat source and designed to have a temperature higher than the temperature of said heat source due to absorption of radiation from said heat source whereby said radiation absorber acts as a radiation shield, and insulation means separating said radiation absorber from said energy source to prevent conductive heat transfer from said radiation absorber to said heat source while permitting energy transfer from said energy source to said radiation absorber.

16. A means in accordance with claim 15 wherein said radiation absorber is in the form of a packed bed of particles and is positioned around said energy source.

17. A means in accordance with claim 16 wherein said particles are in the form of spheres.

18. A means in accordance with claim 16 wherein said particles of said packed bed are selected to provide for different amounts of radiation absorption in different portions of said radiation absorber to obtain a uniformly heated process fluid.

19. A means in accordance with claim 18 wherein said radiation absorber has an annular form, an inner portion and an outer portion with the material of said radiation absorber varying in degree of radiation absorption from said inner portion to said outer portion.

20. A means in accordance with the means of claim 17 wherein said spheres are predetermined varying size to control passage of said heat transfer fluid therethrough.

21. A means in accordance with the means of claim 16 wherein said heat source is formed by a plurality of modules.

22. A means in accordance with the means of claim 21 wherein said modules each define an encapsulated radioisotope in an elongated capsule and a surrounding flow tube, and means separating each said capsule from its surrounding flow tube to provide a heat transfer fluid flow path.

23. A means in accordance with the means of claim 18 wherein said heat source is formed by a plurality of modules.

24. A means in accordance with the means of claim 18 wherein said modules each define an encapsulated radioisotope in an elongated capsule and a surrounding flow tube, and means separating each said capsule from its surrounding flow tube to provide a heat transfer fluid flow path.

25. A means in accordance with the means of claim 22 wherein:

said outer casing is in annular form and is separated from said radiation absorber by a layer of heat insulation, said heat source modules being elongated and extending substantially centrally of said outer casing, and an inner casing separating said insulation layer from said radiation absorber from said outer casing, 26. A means in accordance with claim 25 where said inner casing defines a portion of said inlet plenum and said intermediate plenum.

27. A means in accordance with the means of claim 15 wherein said insulation means is a vacuum layer.

28. A means in accordance with the means of claim 1 and further comprising an overtemperature limit means for controlling temperature of said energy source.

29. A means in accordance with claim 1 and further comprising an enclosing casing surrounding said energy source and radiation absorber, and release means for enabling removal of said energy source from said casing.

30. A means for obtaining a heated process fluid for use as an energy supply means comprising:

an energy source of penetrating radiation, a radiation absorber located in an operative position and designed to have a temperature higher than the temperature of said energy source due to penetrating radiation from said source, said radiation absorber being in the form of a packed bed of particles and defining passageways therethrough, and means for passing said process fluid through said radiation absorber.

31. A device for obtaining a heated process fluid comprising:

an energy source of penetrating radiation, a radiation absorber in the form of a packed bed surrounding said energy source and designed to have a temperature higher than the temperature of said energy source, means for preventing backflow of heat by conduction from said radiation absorber to said energy source, means defining a process fluid flow path in said device passing from an inlet means to a passageway about said energy source then through said radiation absorber and out of said device.

32. A device in accordance with claim 31 wherein, a getter material is located in said flow path at a position in advance of said radiation absorber.

33. A device in accordance with claim 31 wherein, a heat transfer overtemperature limit means surrounds said energy source between said energy source and said flow path.

34. A device in accordance with claim 32 wherein, a heat transfer overtemperature limit means surrounds said energy source between said energy source and said flow path.

35. A device in accordance with claim 33 wherein an exterior casing surrounds said device, said overtemperature limit means is a reflux device having a portion thereof extending externally of said casing.

36. A device in accordance with claim 34 wherein an exterior casing surrounds said device, said overtemperature limit means is a reflux device having a portion thereof extending externally of said casing.

37. A device in accordance with claim 36 wherein a plurality of energy sources are located in said radiation absorber, and said flow path is designed to distribute flow simultaneously about each of said energy sources.

38. A device in accordance with claim 37 wherein said radiation absorber is contained in an internal casing having elongated mounting passageways defined therein for support of said energy sources therein.

and biological shielding separating said exterior casing from said interior casing.

39. A device in accordance with claim 38 wherein said means defining a flow path comprises outwardly extending fin members about each of said heat source means.

40 A high temperature heat source means for use as an energy supply means comprising, an energy source of penetrating radiation, a radiation absorber located in an operative position and designed to have a temperature higher than the temperature of said energy source due to penetrating radiation from said source, means for preventing backflow of heat by conduction from said radiation absorber to said energy source, and means for passing heat transfer fluid through said radiation absorber.

41. A means in accordance with claim 40 wherein the radiation absorber is in the form of a packed bed of particles defining passageways therein.

42. A means in accordance with claim 40 wherein the radiation absorber is in the form of a solid mass with holes penetrating the mass for the passage of heat transfer fluid.

References Cited

UNITED STATES PATENTS

| 3,519,064 | 7/1970 | Cooper | 165—1 |
| 3,519,255 | 7/1970 | Cooper | 165—180 |

CHARLES SUKALO, Primary Examiner

U.S. Cl. X.R.

165—180